United States Patent [19]

Hinze et al.

[11] Patent Number: 5,421,601
[45] Date of Patent: Jun. 6, 1995

[54] TRAILER HITCH COVER

[76] Inventors: Lee R. Hinze, 4493 Lubbock Dr.; Daniel L. McBride, 6217 Anastasia Ave., both of Simi Valley, Calif. 93063

[21] Appl. No.: 131,154
[22] Filed: Oct. 4, 1993
[51] Int. Cl.⁶ .............................................. B60D 1/60
[52] U.S. Cl. ................................ 280/507; 280/511; 70/232; 70/258
[58] Field of Search ................. 280/507, 511, 504; 70/14, 158, 160, 237, 258, 164, 232

[56] References Cited

U.S. PATENT DOCUMENTS

| | | | |
|---|---|---|---|
| 2,458,002 | 1/1949 | Kaskouras | 70/158 |
| 2,497,362 | 2/1950 | Lachowicz | 280/33.44 |
| 3,269,159 | 8/1964 | Young | 280/507 |
| 3,605,457 | 9/1971 | Foster | 70/14 |
| 4,141,569 | 2/1979 | Dilk | 280/507 |
| 4,291,893 | 9/1981 | Hansen | 280/507 |
| 4,459,832 | 7/1984 | Avrea et al. | 70/14 |
| 4,577,884 | 3/1986 | Harris | 280/507 |
| 4,836,570 | 6/1989 | Lopez et al. | 280/507 |
| 4,861,062 | 8/1989 | Stidsen | 280/507 |
| 4,940,371 | 7/1990 | Cholovich | 410/101 |
| 5,087,064 | 2/1992 | Guhlin | 280/507 |
| 5,125,249 | 6/1992 | Fields et al. | 70/160 |

FOREIGN PATENT DOCUMENTS 0539769  4/1957  Canada ................................ 280/507

Primary Examiner—Margaret A. Focarino
Assistant Examiner—Anne Marie Boehler
Attorney, Agent, or Firm—John R. Flanagan

[57] ABSTRACT

A trailer hitch cover includes a removable hollow housing and a latch for securing the enclosure to the hitch so that it will remain in place while it is installed on the hitch. The hollow housing has an enclosed body and a tubular neck connected to and protruding from one wall of the enclosed body and being open at its outer end. The neck has a cross sectional size substantially smaller than that of the body. The enclosed body is formed by a pair of identical halves hinged together. Mating parts of the latch are mounted to identical halves of the tubular neck. The halves of the hitch cover are thus releasably secured together in a clamshell fashion over the hitch so as to be mounted to a portion of the hitch at only the hollow neck of the housing.

7 Claims, 2 Drawing Sheets

TRAILER HITCH COVER

BACKGROUND OF THE INVENTION

1. Field of the Invention

The present invention generally relates to a cover for a trailer hitch and, more particularly, relates to a removable cover used to conceal a trailer hitch when the trailer is not connected to the hitch.

2. Description of the Prior Art

There are basically two types of trailer hitches: a standard ball hitch and a weight distributing hitch. Trailer hitches when attached to the rear of a towing vehicle protrude from the back end of the vehicle. With respect to both types of trailer hitches, it is necessary to keep the ball greased to prevent excessive wear both on the ball as well as the trailer coupler located on the trailer. Also, on weight distributing hitches, it is not only necessary to keep the ball greased but also to keep greased the mechanism on the hitch that supports the weight distribution bars.

If a person walks around or near the rear of the towing vehicle and does not recognize that the hitch is present, the person will likely come in contact with the greased parts of the protruding hitch and soil his or her clothing. Furthermore, the person could easily be injured quite severely through contact with the hitch.

Thus, a cover to prevent inadvertent contact with the trailer hitch would seem to be highly desired. There could be two versions of a cover, one for the standard ball hitch and the other for the weight distributing hitch, since the standard ball hitch is a much smaller assembly than the weight distributing hitch. One known ball hitch cover has a rubber cap which fits over the ball only. However, this hitch cover only protects the ball and not the entire hitch assembly.

Consequently, a need exists for a trailer hitch cover which will overcome the shortcomings and problems of the prior art and will provide protection for persons walking near trailer hitches.

SUMMARY OF THE INVENTION

The present invention provides a trailer hitch cover designed to satisfy the aforementioned need. The trailer hitch cover of the present invention encloses the entire hitch assembly of both hitch types and not just the ball. This is particularly beneficial in the case of the weight distributing hitch since areas other than just the ball are greasy. Also, the hitch cover prevents persons, especially children, from walking into the hitch and injuring themselves and getting grease on themselves. Further, the hitch cover protects the greased areas of the hitch from becoming contaminated with dirt and from being washed off in the rain. Since the hitch cover does not touch the ball or greased areas of the hitch, the cover stays clean and grease free.

Accordingly, the present invention is directed to a trailer hitch cover which comprises: (a) a removable enclosure for entirely enclosing a ball and adjacent parts of a hitch surrounding the ball; and (b) means for securing the enclosure to a portion of the hitch spaced from the ball in order to maintain the enclosure in place on the hitch without contacting the ball and adjacent parts surrounding the ball. The enclosure is a clam-shell shaped hollow housing having an enclosed body and a tubular neck connected to and protruding from one side of the body and being open at an outer end. The tubular neck is of a cross-sectional size substantially smaller than that of the enclosed body such that the housing is only detachably mounted to the portion of the hitch by the tubular neck.

More particularly, the enclosed body is formed of front and rear, top and bottom and a pair of opposite side walls. The tubular neck is connected to and extends from the front wall of the enclosed body. Also, the enclosed body and tubular neck are split into a pair of opposite portions through the top and bottom walls and the front and rear walls of the body and through top and bottom wall sections of the neck.

Further, the housing includes at least one hinge having first and second hinge parts being respectively mounted to the opposite portions of the body. The securing means is a latch having first and second latch parts adapted to be releasably coupled to one another. The first and second latch parts are mounted respectively on the opposite portions of the tubular neck.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
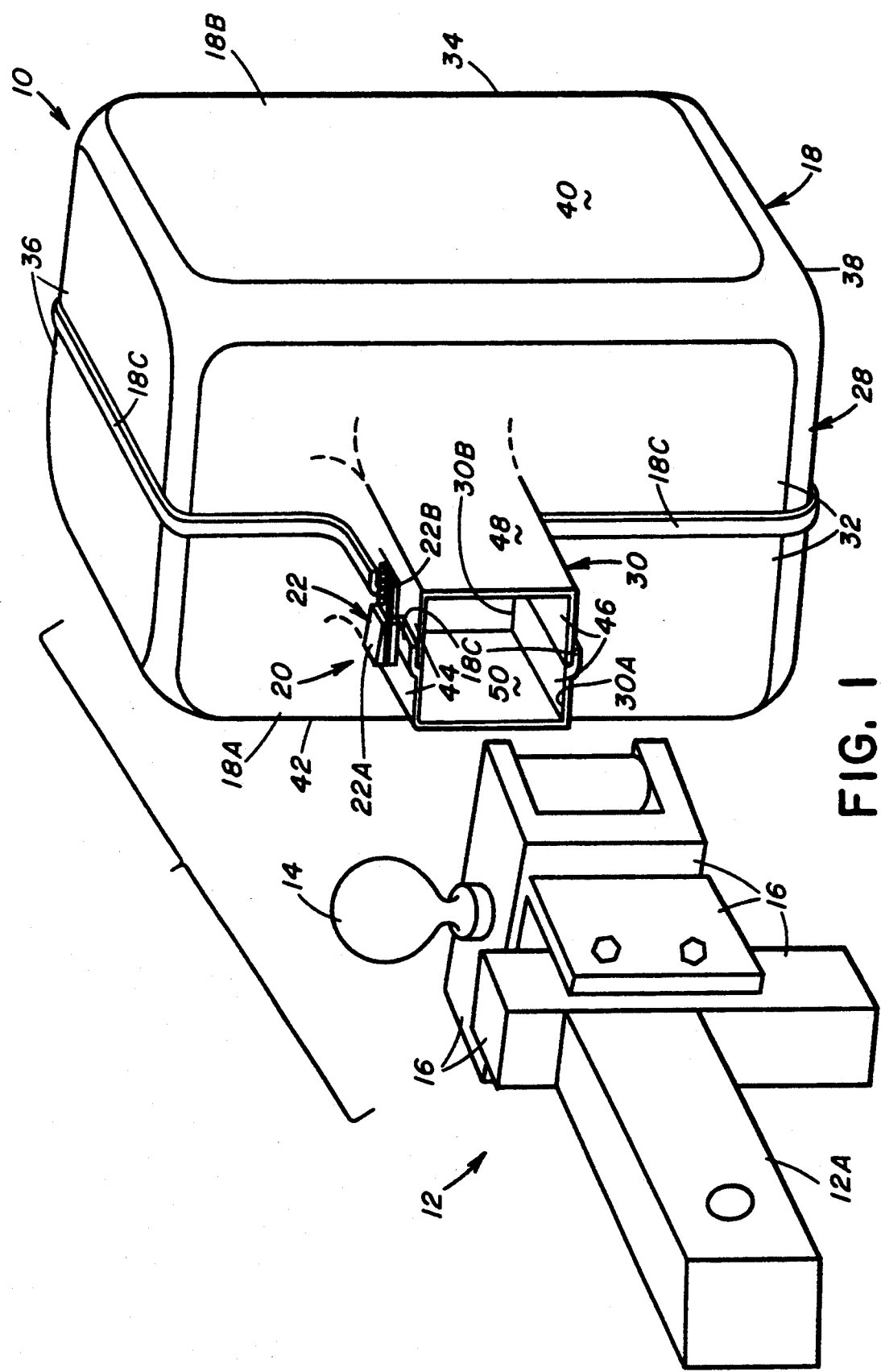
FIG. 1 is a perspective view of a standard trailer hitch and a hitch cover of the present invention adapted to fit over and completely enclose the hitch.

Referring to the drawings, and particularly to FIG. 1, there is illustrated a preferred embodiment of a trailer hitch cover, generally designated 10, of the present invention. The hitch cover 10 is adapted to fit over and completely enclose rear end components of a standard trailer hitch 12. Such rear end components of the hitch 12 are those that protrude beyond the rear end of a vehicle which include a ball 14 and adjacent parts 16 of the hitch 12 surrounding ball 14 which are typically covered with grease to reduce wear and allow a connection between the hitch 12 and a trailer tongue (not shown) to function properly.

Figure 2:
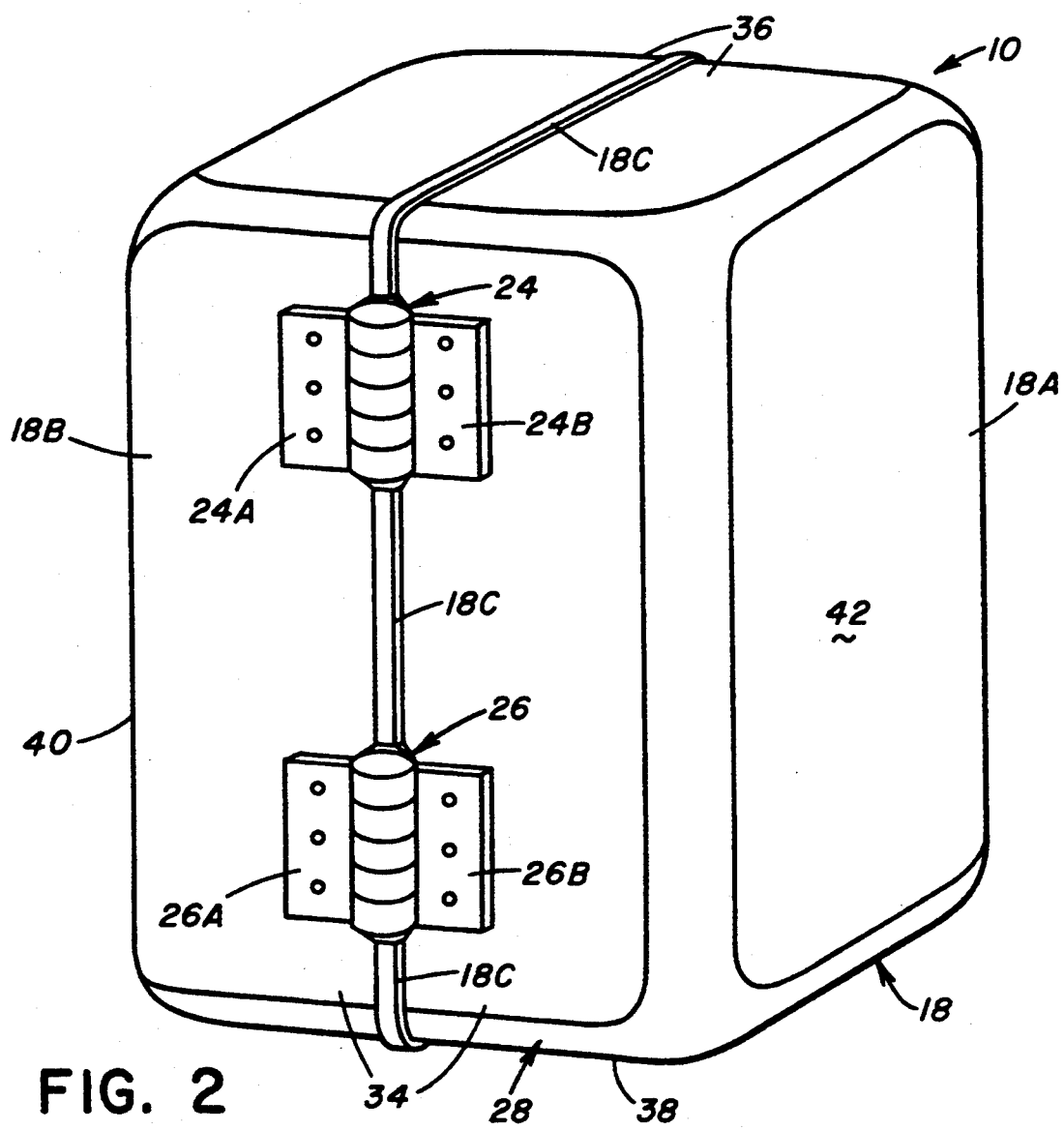
FIG. 2. is a rear perspective view of the hitch cover of FIG. 1.
Figure 3:
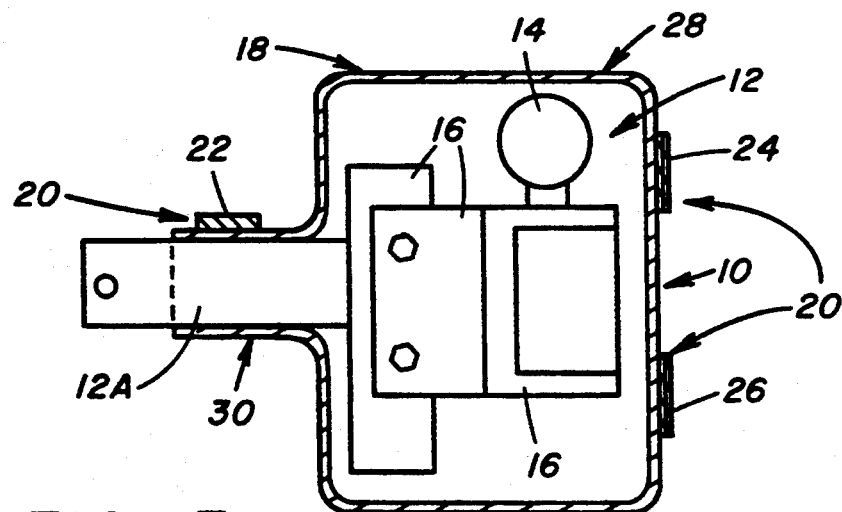
FIG. 3 is a longitudinal sectional view of the hitch cover of FIG. 1.

Referring to FIGS. 1–3, basically the hitch cover 10 includes a removable enclosure in the form of a hollow housing 18 adapted to entirely enclose the above-mentioned rear end components 14, 16 of the hitch 12 and means 20 for releasably securing the housing 18 over the hitch 12. Preferably, the hollow housing 18 is constituted by a pair of substantially identical housing halves 18A, 18B arranged in a mirror image relation to one another. The securing means 20 includes a latch 22 and at least one and, preferably, a pair of hinges 24, 26 attached on the halves 18A, 18B of the hollow housing 18. The latch 22 and hinges 24, 26 facilitate opening and closing of the identical halves 18A, 18b of the housing 18 in a clam-shell fashion in order to install the hitch cover 10 onto and remove it from a structural portion 12A of the hitch 12 spaced from the rear end components 14, 16 in order to maintain the housing 18 in place on the hitch 12 without contacting the rear end components 14, 16 which are typically covered with grease.

More particularly, the hollow housing 18 includes an enclosed body 28 and a tubular neck 30 integrally connected to and protruding from one side of the enclosed body 28 and being open at opposite outer and inner ends 30A, 30B. The enclosed body 28 is formed of front and rear walls 32, 34, top and bottom walls 36, 38 and a pair of opposite side walls 40, 42. The tubular neck 30 is integrally connected to and extends from the front wall 32 of enclosed body 28. The tubular neck 30 is formed of top and bottom wall sections 44, 46 and a pair of opposite side wall sections 48, 50. To provide the clamshell configuration of the housing 18, the enclosed body 28 is split in half along substantially the centerlines of the front and rear walls 32, 34 and top and bottom walls 36, 38 thereof. Similarly, the tubular neck 30 is split in half along substantially the centerlines of the top and bottom wall sections 44, 46 thereof. A flange 18C is provided on the edge of the housing half 18A which overlies the edge on the housing half 18B when the housing 18 is in the closed condition shown in FIGS. 1 and 2.

Both the enclosed body 28 and tubular neck 30 have generally rectangular cross-sectional shapes. However, the cross-sectional size of the tubular neck 30 is substantially smaller than that of the enclosed body 28 and matched closely to that of the structural portion 12A of the hitch 12 such that the hollow housing 18 only contacts the portion 12A of the hitch 12 by being detachably mounted to the hitch 12 only at the hitch portion 12A by the tubular neck 30, as shown in FIG. 3.

Also, the latch 22 has a pair of first and second latch parts 22A, 22B mounted respectively on adjacent portions of the split top wall section 44 of the tubular neck 30. The latch 22 is a conventional type per se, with the parts 22A, 22B adapted to be releasably coupled to one another so as to tightly clamp the halves 18A, 18B of the hollow housing 18 together at their common split plane. Each of the hinges 24, 26 also have respective pairs of first and second hinge parts 24A, 24B and 26A, 26B being mounted respectively on the adjacent portions of the split rear wall 34 of the housing 18.

To summarize, the hitch cover 10 of the present invention employs a hollow housing 18 having an enclosed body 28 and a tubular neck 30 protruding from the body 28. The neck 30 is the only part of the hitch cover 10 which detachably secures the cover 10 to the hitch 12. The hitch cover 10 is installed over the hitch 12 by opening the clam-shell housing 18 and placing it about the hitch 12. The split hollow housing 18 is then closed and the latch 22 is latched to retain the hollow housing 18 on the hitch 12.

To summarize further, the hitch cover 10 of the present invention provides the following advantages:

(1) Covers the entire rear end portion of the hitch 12 and not just the ball 14. This is particularly beneficial when a weight distributing hitch is used since areas other than just the ball 14 need to be greased.

(2) Prevents someone from walking into the hitch 12 and injuring themselves.

(3) Prevents someone from getting grease on themselves.

(4) Prevents children from playing with the hitch 12 and getting grease on themselves.

(5) Protects the greased areas of the hitch 12 from becoming contaminated with dirt.

(6) Prevents the grease on the hitch 12 from being washed off in the rain.

(7) Since the hitch cover 10 does not touch the ball 14 or greased areas where in the case of a weight distributing hitch the weight distributing bars are attached, the hitch cover 10 stays clean and grease free.

It is thought that the present invention and its advantages will be understood from the foregoing description and it will be apparent that various changes may be made thereto without departing from the spirit and scope of the invention or sacrificing all of its material advantages, the form hereinbefore described being merely a preferred or exemplary embodiment thereof.

We claim:

1. In combination with a trailer hitch having a ball supported on one end of said hitch, a trailer hitch cover, comprising:

(a) a removable enclosure entirely enclosing said ball and adjacent parts of said end of said hitch supporting said ball, said enclosure being a hollow housing having an enclosed body and a tubular neck connected to and protruding from one side of said body, said tubular neck having a pair of spaced open inner and outer ends, said tubular neck at said inner end thereof being connected to said one side of said enclosed body, said enclosed body and tubular neck of said hollow housing being split longitudinally to form a pair of parts of said hollow housing each having a body portion and a neck portion, said pair of parts of said hollow housing being movable toward and away from one another to install said hollow housing on and remove said hollow housing from said ball and adjacent parts of said end of said hitch; and (b) means for a detachably securing said hollow housing at said relatively movable neck portions of said pair of parts of said hollow housing to a portion of said hitch spaced from said ball in order to maintain said enclosure in place on said hitch with said enclosed body extending around said ball and said adjacent parts of said end of said hitch supporting said ball but without contacting said ball and said adjacent parts, said securing means including (i) a latch having first and second latch parts adapted to be releasably coupled to one another, said first and second latch parts being respectively mounted on said neck portions of said first and second parts of said hollow housing, and (ii) a pair of hinges each having first and second hinge parts mounted respectively to said body portions of said pair of parts of said hollow housing on a side thereof opposite from said one side of said hollow housing so as to pivotally connect said parts of said hollow housing together such that they can be opened and closed in a clamshell fashion.

2. The hitch cover of claim 1 wherein said enclosed body is formed of front and rear, top and bottom and a pair of opposite side walls.

3. The hitch cover of claim 2 wherein said tubular neck is connected to and extends from said front wall of said enclosed body.

4. The hitch cover of claim 2 wherein said enclosed body is split longitudinally through said top and bottom walls and said front and rear walls thereof.

5. The hitch cover of claim 1 wherein said tubular neck is formed of top and bottom wall sections and a pair of opposite side wall sections.

6. The hitch cover of claim 5 wherein said tubular neck is split longitudinally through said top and bottom wall sections thereof.

7. The hitch cover of claim 1 wherein said tubular neck has a cross-sectional size substantially smaller than that of said enclosed body such that said housing is only detachably mounted to the portion of the hitch by said tubular neck.

* * * * *